United States Patent
Gengler (10) Patent No.: US 7,997,218 B2
(45) Date of Patent: Aug. 16, 2011

(54) SOIL STRIP ASSEMBLY FOR SEED DRILL ROW UNIT

(75) Inventor: Allan S. Gengler, Beloit, KS (US)

(73) Assignee: Landoll Corporation, Marysville, KS (US)

( * ) Notice: Subject to any disclaimer, the term of this patent is extended or adjusted under 35 U.S.C. 154(b) by 0 days.

(21) Appl. No.: 12/505,785

(22) Filed: Jul. 20, 2009

(65) Prior Publication Data

US 2011/0011317 A1    Jan. 20, 2011

(51) Int. Cl.
*A01C 5/00* (2006.01)
*A01C 13/00* (2006.01)

(52) U.S. Cl. ........ 111/164; 111/167; 111/189; 111/194; 111/197

(58) Field of Classification Search .......... 111/189–191, 111/197, 164, 139, 140, 194, 167; 172/556, 172/558–565, 139–142; 403/3, 4, 22
See application file for complete search history.

(56) References Cited

U.S. PATENT DOCUMENTS 5,626,196 A    5/1997 Hughes
7,063,495 B1 *  6/2006 Johnson ........................ 414/511

OTHER PUBLICATIONS

"Series 9000 Grain Drills", *Sunflower Product Product Brochure*, Jul. 8, 2009.
"Sunflower Products Grain Drills All-Purpose Opener", www.sunflowermfg.com/products/index Jul. 8, 2009.

* cited by examiner

*Primary Examiner* — Christopher J. Novosad
(74) *Attorney, Agent, or Firm* — Law Office of Mark Brown, LLC; Mark E. Brown (57) ABSTRACT

An agricultural implement includes a seed drill row unit with an arm and an opener disc assembly rotatably mounted on the row unit arm. A soil strip assembly includes a mounting bracket with a mounting bracket base and first and second bracket arms. Each of the bracket arms has a front end attached to the bracket base and a trailing back end. The base is attached to the row unit arm in front of the opener disc assembly. Each of the mounting bracket arms extends rearwardly from the base along a respective side of the disc assembly. First and second flexible soil strips are attached to the first and second mounting bracket arms respectively and extend downwardly and rearwardly therefrom along either side of the disc assembly.

25 Claims, 6 Drawing Sheets

SOIL STRIP ASSEMBLY FOR SEED DRILL ROW UNIT

BACKGROUND OF THE INVENTION

1. Field of the Invention

The present disclosed technology relates generally to agricultural implements, and in particular to a soil strip assembly for a seed drill row unit.

2. Description of the Related Art

Modern farming operations use specialized agricultural implements to plant seeds in soil having a variety of pre-planting conditions. Seed drills are agricultural tilling implements that plant seeds in row crops by using overlapping discs depending from a supporting structure to penetrate the soil and create a trench in which the seed is deposited. The soil encountered by the seed drill may have been prepared by various tilling implements, or the soil may not have received any tilling whatsoever ("no-till" farming). Tilling is used to prepare the soil for planting seeds by mixing into the soil any fertilizers, herbicides, or organic matter (residue) such as weeds or the remnants from the preceding crop.

A multitude of factors affect crop yield including operation of the discs, proper seed trench creation, and replacement of the disturbed soil and residue. As the discs travel forward through the soil and residue, the material is mechanically displaced to allow planting of the seeds. If the residue is particularly tall it can become lodged between the top of the forward-advancing rotating discs and the overhead supporting structure affecting performance of the discs. Controlling the dispersal of soil and residue material, and replacement of the soil over the seeds is important for proper soil contact with the seed, germination of the seed, and maximum viability of the crop.

Various attachments have been used in an attempt to control dispersal or blow out of material during the planting process. For example, elongated flat metallic and non-metallic scrapers have been attached to the axles of discs in an attempt to control blow out of soil and residue. Such an approach is complicated because it requires the use of a multitude of bolts and mounting plates to attach the scrapers to the outside of each disc, and adjustment of the scrapers or discs requires adjustment of two assemblies for each seed drill row unit. Moreover, such scrapers do not protect the upper portion of the disc from being clogged by residue, and the scraper mechanisms themselves can become fouled up with soil and residue affecting their operation. The aforementioned problems increase the maintenance time and expense necessary to operate the seed drill. What is needed is an attachment for a seed drill that is simple to manufacture, install, adjust and maintain, and protects the opener assembly from becoming fouled with residue in addition to reducing soil blow out from the seed trench.

Heretofore there has not been available a soil strip assembly with the advantages and features of the present invention.

SUMMARY OF THE INVENTION

The disclosed soil strip assembly for attachment to a seed drill row unit includes a pair of ultra high molecular weight (UHMW) plastic soil strips to prevent soil and residue blow out attached to a V-shaped steel mounting bracket to prevent the seed drill opener discs from becoming fouled up with reside. The mounting bracket has a vertical rectangular opening at its base for securing, by a nut and bolt combination, to a tab located in front of the opener discs. The arms of the v-shaped mounting bracket arch downwardly and rearwardly alongside the exterior of the discs to a point just below the center of each disc. The soil strips are sandwiched between the ends of the arms by spring steel back plates providing additional rigidity to the soil strips preventing hyper-extension of the rear portion of the soil strips.

The limited number of components of the soil strip assembly, and the simplicity of manufacture, installation and adjustment, decrease the maintenance time and expense necessary to manufacture and operate the row unit.

BRIEF DESCRIPTION OF THE DRAWINGS

The drawings constitute a part of this specification and include exemplary embodiments of the disclosed subject matter illustrating various objects and features thereof, wherein like references are generally numbered alike in the several views.

DETAILED DESCRIPTION OF THE PREFERRED ASPECTS

I. Introduction and Environment

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Soil Strip Assembly 2

Figure 1:
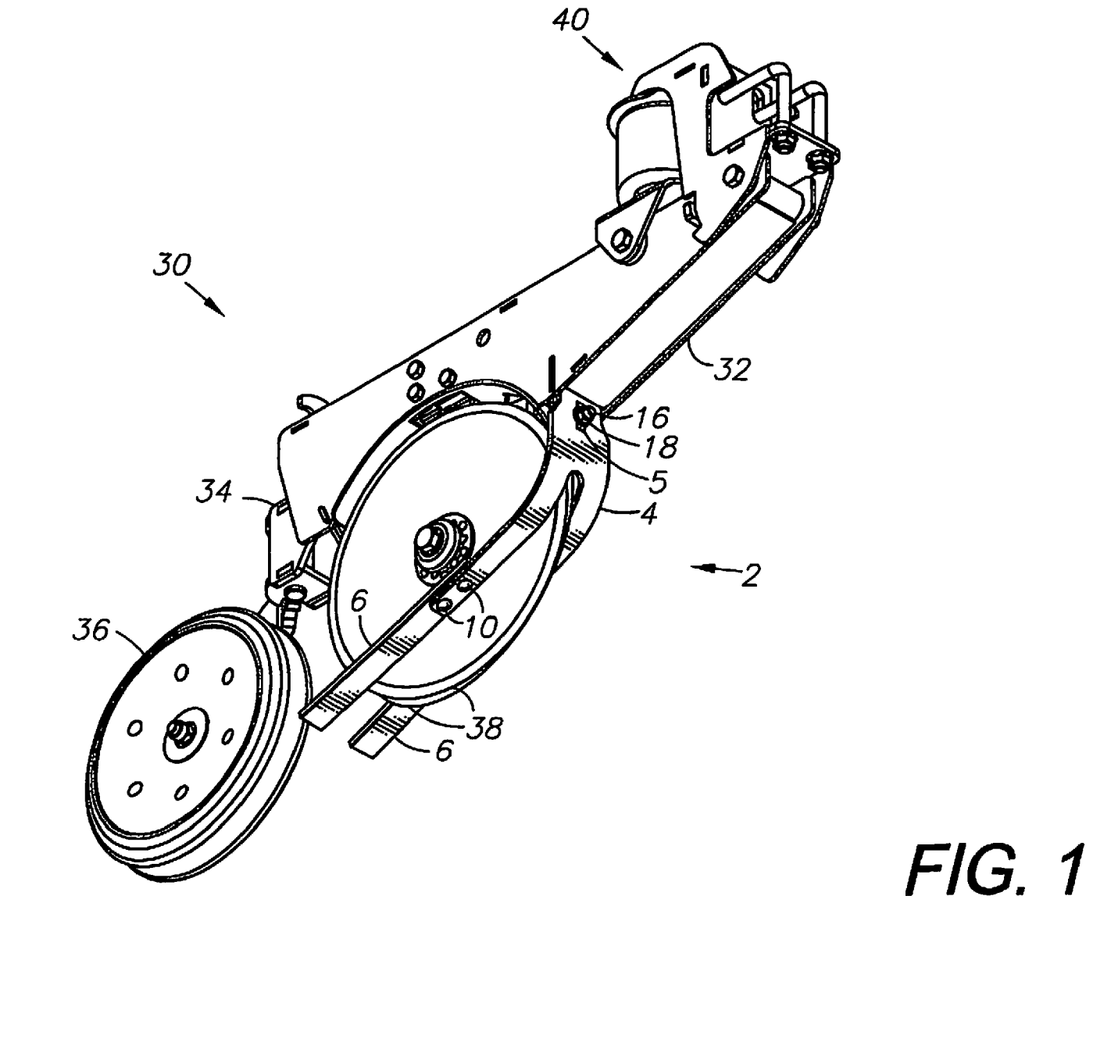
FIG. 1 is a lower, right, forward perspective view of a soil strip assembly embodying the present invention.

Referring to the drawings in more detail, the reference numeral 2 generally designates a soil strip assembly embodying the principles of the disclosed subject matter. Referring to FIG. 1, an embodiment of the soil strip assembly 2 is shown in use with an agricultural implement, specifically a seed drill row unit 30 for depositing seeds in the soil 54. The row unit 30 generally consists of a rearwardly extending arm 32 having a box-like construction, mounting a press wheel 36 on a trailing arm 34, and mounting a pair of opener discs 38 midway between the press wheel and the front of the arm 32. The front end of the arm 32 is secured to a tool bar 50 by a mounting system 40. In operation, the tool bar 50 extends laterally behind a tractor (not shown) or other suitable farm machinery, pulling a multitude of laterally spaced row units 30. As the overlapping opener discs 38 advance, they push down into the soil 54, causing lateral displacement and creating a furrow or trench 52 in which the seeds are deposited. The displaced soil 54 and residue is diverted up and out of the trench 52 along the exterior edge of each disc 38. The soil strip assembly 2 reduces unwanted displacement of the soil 54 and residue, and prevents fouling of the discs 38 by residue. The row units 30 are described in U.S. patent application Ser. No. 12/500,508 for Air Spring Down-Pressure System for Implement, which is assigned to a common assignee and is incorporated herein by reference.

Figure 2:
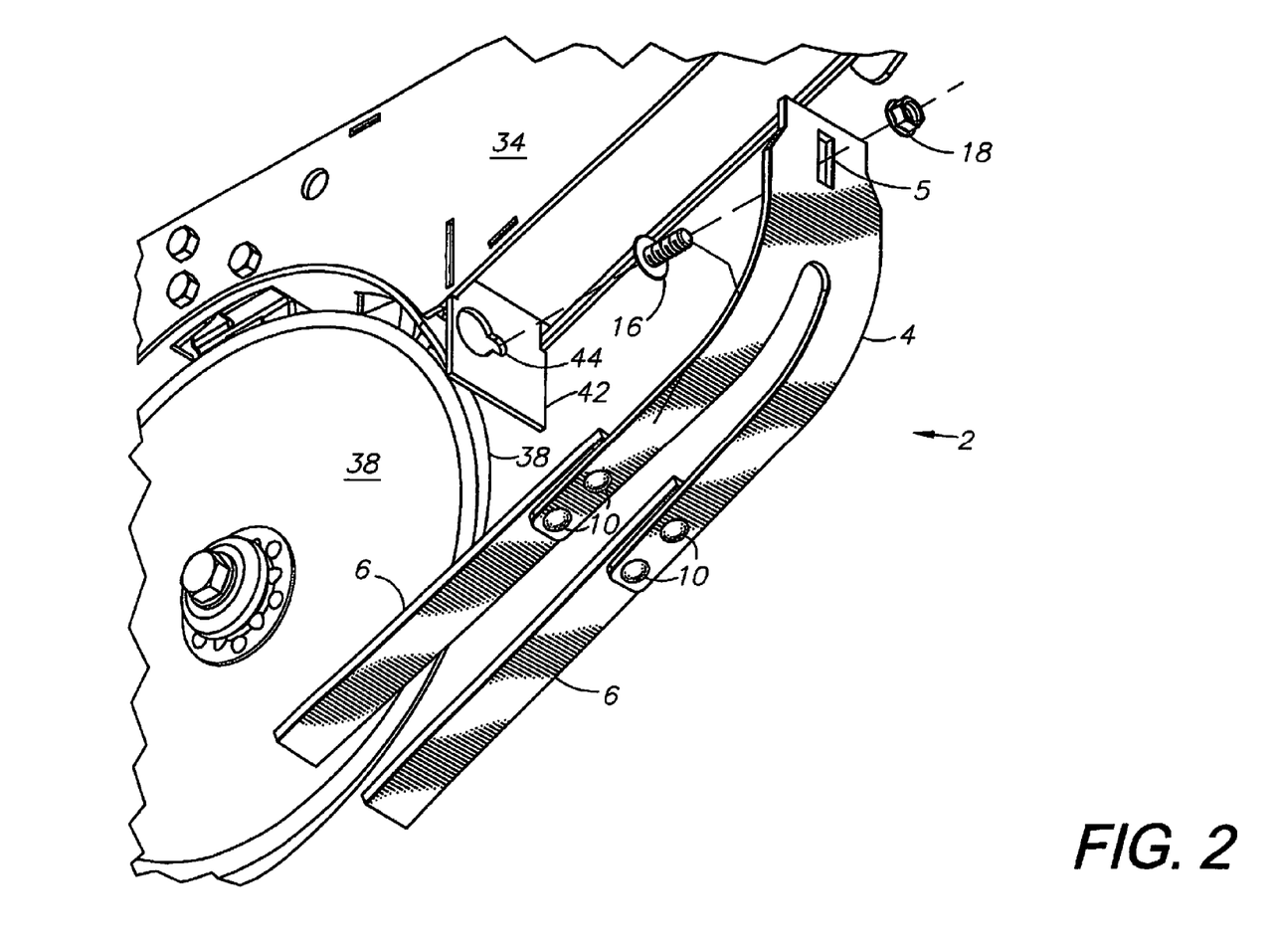
FIG. 2 is an enlarged exploded view of the soil strip assembly of FIG. 1.
Figure 3:
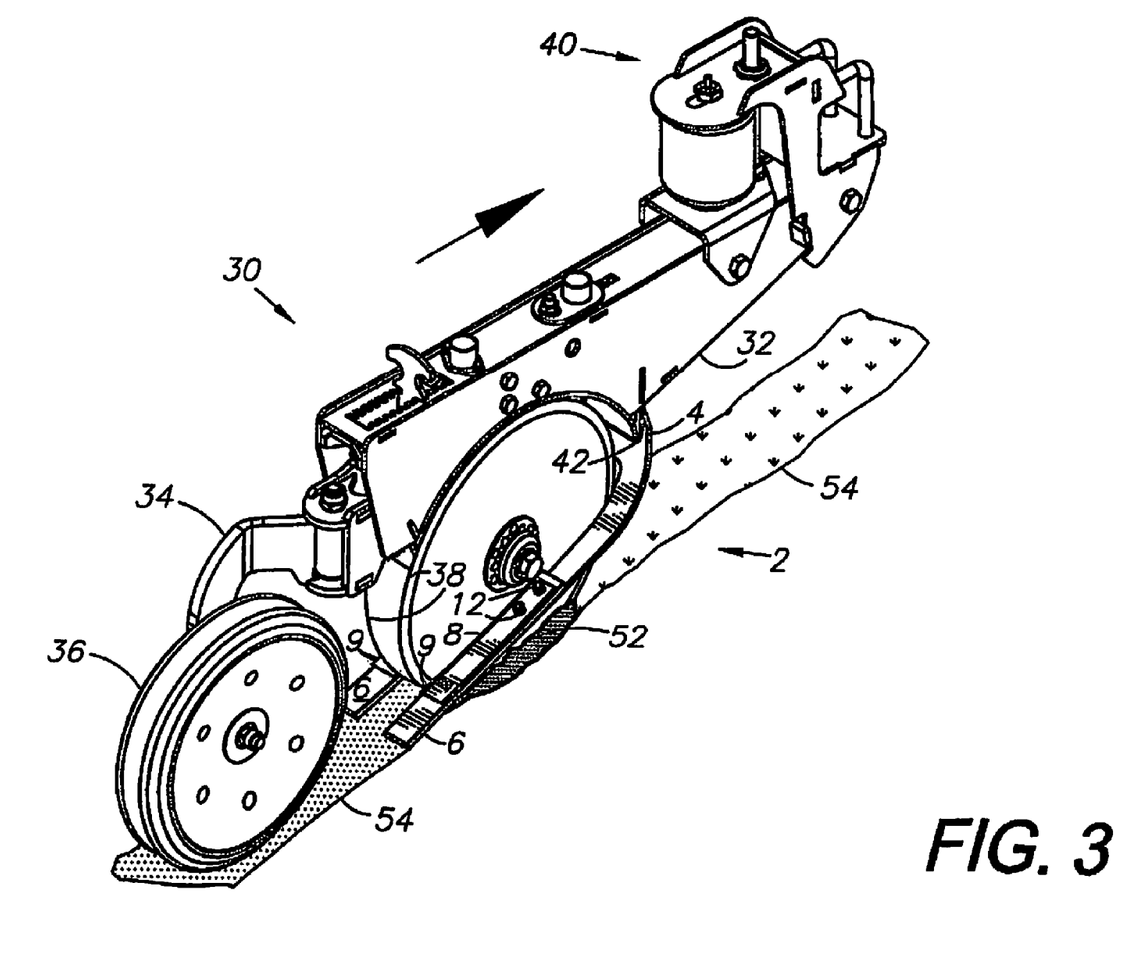
FIG. 3 is an upper, right, rear perspective view of the soil strip assembly.

The soil strip assembly 2 generally consists of a pair of back plates 8 and soil strips 6 attached to a mounting bracket 4. The soil strip assembly 2 is releasably secured to a mounting plate 42 on the row unit 30 by the mounting bracket 4 (FIG. 2). The mounting plate 42 depends from the bottom of the arm 32 and is located forward of the leading edge of the discs 38. The mounting plate 42 has a keyhole-shaped slot 44 adapted for passing the head of a bolt 16 therethrough, and slidably receiving the neck of the bolt 16. The mounting bracket 4 is secured to the mounting plate 42 by aligning the neck of the bolt 16 within the slot 44 and tightening the locking nut 18.

Figure 4:
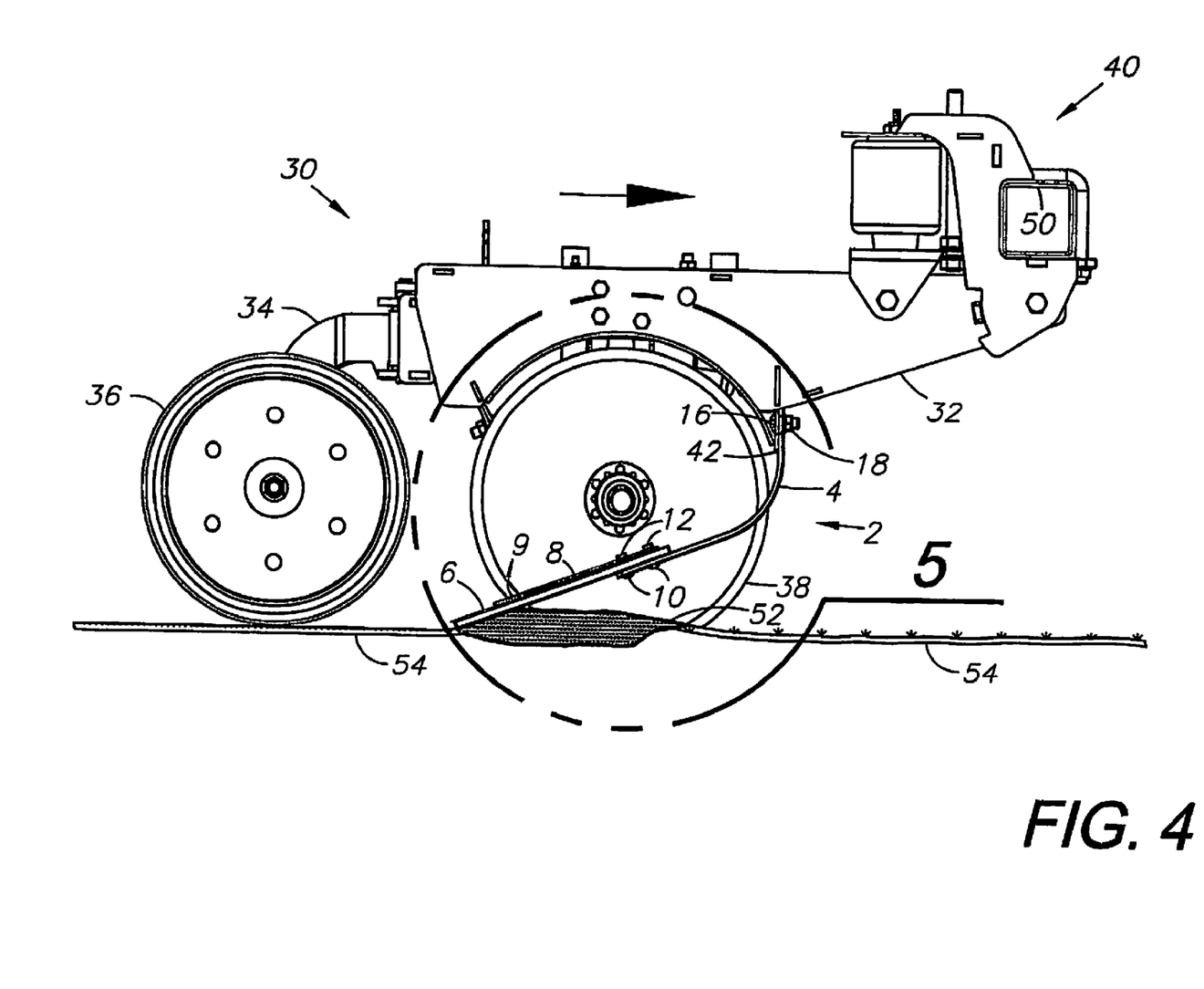
FIG. 4 is a right side elevational view of the soil strip assembly.
Figure 5:
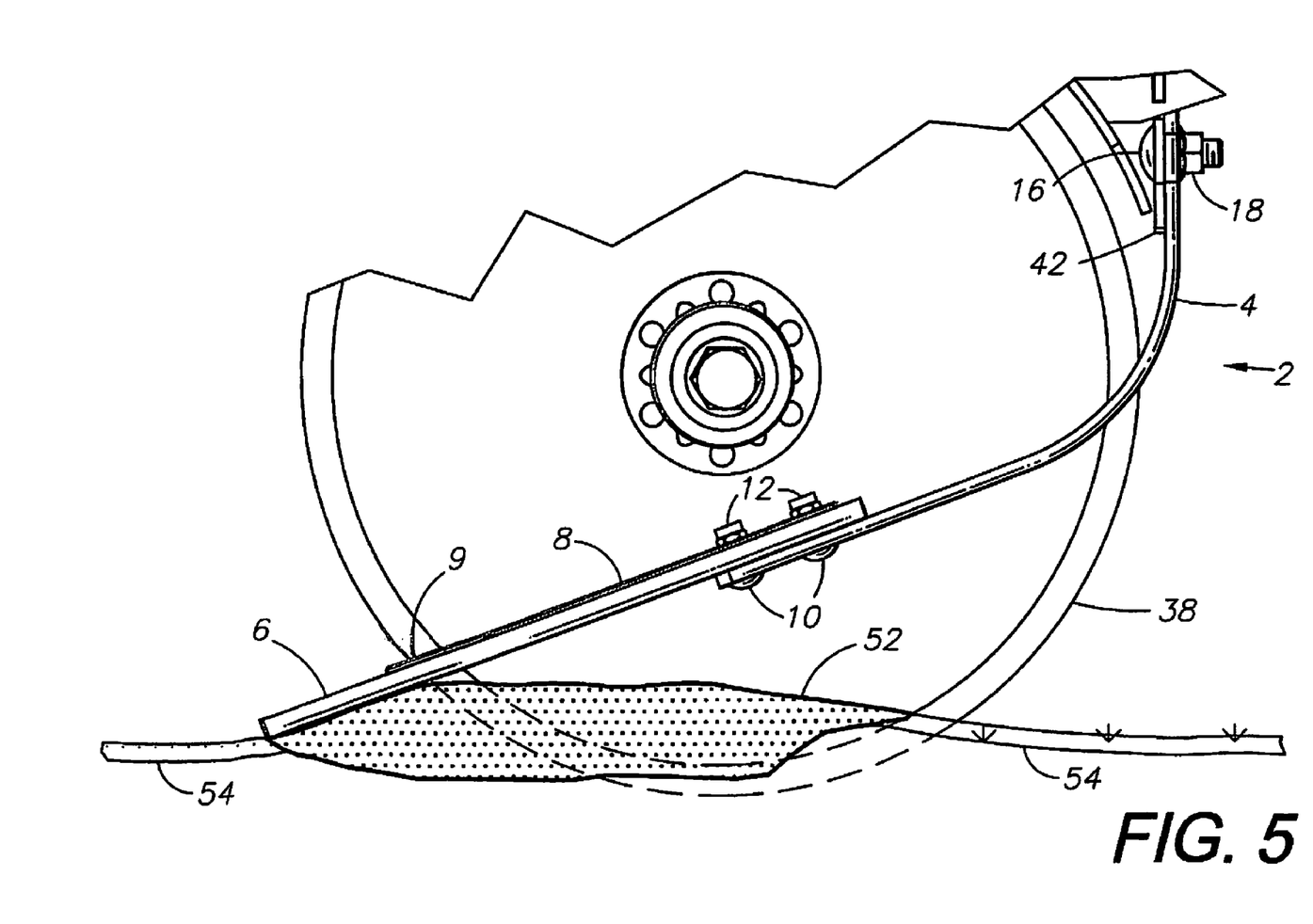
FIG. 5 is an enlarged, fragmentary elevational view of the soil strip assembly taken generally within circle 5 in FIG. 4.

The mounting bracket 4 is manufactured from flat steel and is of a generally planar V-shaped configuration. The base of the V-shaped mounting bracket 4 has a vertical rectangular adjustment slot 5 for single point attachment of the soil strip assembly 2 to the row unit 30, and for changing the vertical and horizontal alignment of the soil strip assembly 2 relative to the discs 38. The arms of the V-shaped mounting bracket depend from the upper portion of the mounting bracket 4 and arch rearwardly, straddling the discs 38, and terminate at a point outside and below the center of each disc 38 (FIG. 4). The mounting bracket 4 functions as both an attachment point for the soil strips 6 and back plates 8, and block residue and debris from fouling up the discs 38.

The soil strips 6 are generally elongated, narrow strips of ultra high molecular weight (UHMW) plastic attached at a forward end to the top of the trailing end of each arm of the V-shaped mounting bracket 4. Each strip 6 has a pair of alignment holes there through for receiving attachment bolts 10. Each strip 6 attaches at the forward end to the top of an arm, and extend rearwardly and downwardly from the bracket 4 alongside the exterior of the discs 38 in contact with the soil 54, to a point just behind the trailing edge of the disc 38 and slightly above the bottom edge of the disc 38.

A back plate 8, manufactured from an elongated strip of spring steel, is in contact with the top of the soil strip 6, and is dimensioned to compliment the width of the soil strip 6. Each back plate 8 has a pair of alignment holes at their forward ends for receiving attachment bolts 10. The back plate 8 is attached at the forward end to the top of the soil strip 6 and extends rearward along, and in contact with, the top of the soil strip 6 to a trailing edge 9. The forward end of both the soil strip 6 and back plate 8 are attached to the mounting bracket 4 by sandwiching the soil strip 6 between the back plate 8 and mounting bracket 4, and securing all three together using two attachment bolts 10 and locknuts 12.

The soil strips 6 operate in conjunction with the mounting bracket 4 to reduce the soil "blow out" and residue displacement created by the forward-advancing row unit 30. As the discs 38 create a trench 52, the soil strips 6, back plates 8, and mounting bracket 4 bias against the displaced soil 54 and residue, and direct the soil 54 and residue under the soil strip 6. The arched shape of the mounting bracket 4 knocks down upstanding residue as the row unit 30 advances preventing the residue from becoming uprooted from the soil and lodged between the upper edge of the discs 38 and the lower edge of the arm 32. Furthermore, the shape of the mounting bracket 4 permits it to flex against the forces exerted upon the soil strips 6 created by stiff residue and the buildup of soil 54. The soils strips 6 flex as they encounter the buildup of soil and residue alongside the discs 38, thus controlling blow out of the soil 54 and disturbance of the residue. The back plate 8 adds additional rigidity to the forward portion of the soil strip 6, and the trailing edge 9 prevents hyper-flexion of the rear portion of the soil strip 6.

The single point of attachment of the soil strip assembly 2, and the simplicity of its components, makes the assembly 2 easy to install, adjust and maintain, thereby decreasing the maintenance time and expense necessary to keep the row unit 30 operational.

III. Alternative Embodiment Implement 102

Figure 6:
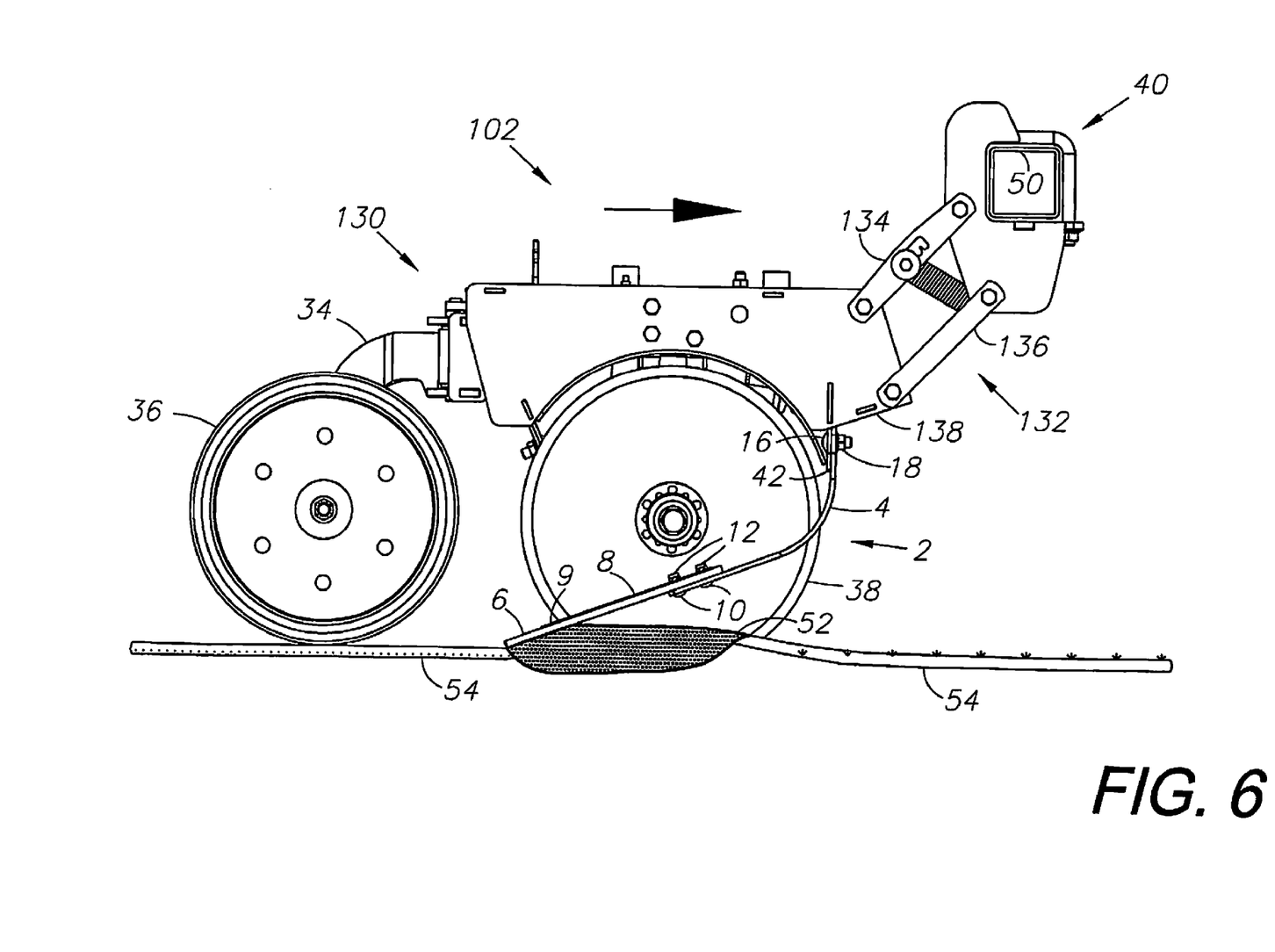
FIG. 6 is a right side elevational view of an implement comprising an alternative embodiment of the present invention and including a soil strip assembly mounted on a row unit attached to a tool bar with parallel linkage.

FIG. 6 shows an implement 102 comprising an alternative embodiment or aspect of the present invention. The implement 102 is equipped with a soil strip assembly 2, which is similar to the soil strip assembly 2 described above in connection with the row unit 30. The implement 102 includes a row unit 130 with a parallel-arm linkage subsystem 132 including right and left pairs of upper and lower linkage arms 134, 136 mounting a row unit arm 138 on a tool bar 50. Similar components of the soil strip assemblies 2 are designated with the same reference numerals. The parallel-arm linkage subsystem 132 maintains the row unit arm 138 substantially parallel to a ground surface throughout its range of motion. The soil strip assembly 2 functions in a substantially similar manner with both configurations of row units 30, 130.

IV. Conclusion

It will be appreciated that the components of the soil strip assembly 2 can be used for various other applications. Moreover, the soil strip assembly 2 can be fabricated in various sizes and from a wide range of suitable materials, using various manufacturing and fabrication techniques.

It is to be understood that while certain aspects of the disclosed subject matter have been shown and described, the disclosed subject matter is not limited thereto and encompasses various other embodiments and aspects.

Having thus described the disclosed subject matter, what is claimed as new and desired to be secured by Letters Patent is:

1. An agricultural implement comprising:
   a seed drill row unit including an arm and an opener disc assembly rotatably mounted on said row unit arm;
   a soil strip assembly including a mounting bracket having a bracket base and first and second bracket arms, each of said bracket arms having a front end attached to said bracket base and a trailing back end;
   said base being attached to said row unit arm in front of said opener disc assembly;
   each of said mounting bracket arms extending rearwardly from said base along a respective side of said disc assembly; and
   an air spring down-pressure system for applying a down pressure to said disc and said soil strip assembly.

2. The agricultural implement of claim 1, which includes:
   first and second flexible soil strips each having a front end mounted in overlying relation on top of a respective mounting bracket arm trailing back end;
   said first and second flexible soil strips each having a trailing back end; and said soil strips extending downwardly and rearwardly from said mounting bracket arms along either side of said disc assembly.

3. The agricultural implement of claim 2, which includes:
said soil strips comprising ultra high molecular weight (UHMW) plastic.

4. The agricultural implement of claim 2, which includes:
first and second back plates mounted on top of said first and second soil strips respectively;
each back plate having a front end attached to a respective soil strip front end and a respective bracket arm back end; and
each said back plate having a back end terminating in front of a respective soil strip back end.

5. The agricultural implement of claim 4, which includes:
each said bracket arm back end, soil strip front end and back plate front end having a pair of soil strip mounting bolt receivers;
respective bracket arm, soil strip and back plate receivers being aligned; and
first and second pairs of soil strip fasteners each comprising a carriage bolt with a head located below a respective bracket arm and a locknut located above a respective back plate.

6. The agricultural implement of claim 2 wherein said bracket arms and said soil strips diverge rearwardly from said mounting bracket base.

7. The agricultural implement of claim 6 wherein said soil strips extend rearwardly from a rear edge of said disc assembly.

8. The agricultural implement of claim 7 wherein said bracket arms and said soil strips slope downwardly and rearwardly from said mounting bracket base.

9. The agricultural implement of claim 1, which includes:
a mounting plate mounted on said arm in front of said disk assembly; and
said bracket base being vertically adjustably attached to said mounting plate whereby an operating depth of said soil strip assembly is adjustable relative to said disc assembly.

10. The agricultural implement of claim 9, which includes:
said row unit arm having a pair of side plates forming a downwardly-open channel;
said mounting plate and said bracket base being received in said channel; and
said row unit arm side plates engaging said bracket base in an anti-rotational engagement therewith whereby said soil strip assembly is secured against rotation relative to said disc assembly.

11. The agricultural implement of claim 1, which includes:
a mounting bracket fastener comprising a mounting bolt and a mounting nut;
a mounting plate depending downwardly from said row unit arm and having a mounting bolt receiver;
said mounting bracket base having a mounting bolt receiver aligned with said receiver in said mounting plate; and
at least one of said mounting bolt receivers comprising an elongated slot adapted for vertically slidably receiving said mounting bolt whereby said soil strip assembly is vertically adjustable.

12. The agricultural implement of claim 11, which includes:
said mounting plate having a keyhole slot adapted to receive the head of a respective mounting bracket mounting bolt.

13. An agricultural implement comprising:
a seed drill row unit including a rearwardly extending arm, a disc assembly having a pair of discs rotatably mounted on and depending from said arm for working soil, said discs creating a trench in the soil as said row unit moves forward; and
a soil strip assembly including:
(a) a mounting bracket with a bracket base and first and second bracket arms, each of said bracket arms having a front end attached to said bracket base and a trailing back end;
(b) each of said mounting bracket arms extending rearwardly from said base along a respective side of said disc assembly;
(c) a mounting plate attached to said row unit arm in front of said disc assembly;
(d) said row unit arm having a pair of side plates forming a downwardly-open channel;
(e) said mounting plate and said bracket base being received in said channel;
(f) said row unit arm side plates engaging said bracket base in an anti-rotational engagement therewith whereby said soil strip assembly is secured against rotation relative to said disc assembly;
(g) a mounting bracket fastener comprising a bolt and a nut;
(h) said mounting plate depending downwardly from said row unit arm and having a mounting bolt receiver;
(i) said mounting bracket base having a mounting bolt receiver aligned with said receiver in said mounting plate;
(j) at least one of said mounting bolt receivers comprising an elongated slot adapted for vertically slidably receiving said mounting bolt whereby said soil strip assembly is vertically adjustable;
(k) first and second flexible soil strips each having a front end and a back end, said front end attached to the top of a respective mounting bracket arm back end;
(m) said soil strips extending downwardly and rearwardly from said mounting bracket arms along either side of said disc assembly;
(n) first and second back plates mounted on top of said first and second soil strips respectively;
(o) each back plate having a front end attached to a respective soil strip front end and a respective bracket arm back end;
(p) each said back plate having a back end terminating in front of a respective soil strip back end;
(q) each said bracket arm back end, soil strip front end and back plate front end having a pair of soil strip mounting bolt receivers;
(r) respective bracket arm, soil strip and back plate receiver pairs being aligned; and
(s) first and second pairs of soil strip fasteners each comprising a carriage bolt with a head located below a respective bracket arm and a locknut located above a respective back plate.

14. The agricultural implement of claim 13, which includes:
said mounting plate having a keyhole slot adapted to receive the head of said mounting bracket mounting bolt.

15. The agricultural implement of claim 13 wherein said bracket arms and said soil strips diverge rearwardly from said mounting bracket base.

16. The agricultural implement of claim 15 wherein said soil strips extend rearwardly from a rear edge of said disc assembly.

17. The agricultural implement of claim 16 wherein said bracket arms and said soil strips slope downwardly and rearwardly from said mounting bracket base.

18. The agricultural implement of claim 13 wherein:
said soil strips comprise ultra high molecular weight (UHMW) plastic.

19. The agricultural implement of claim 13 wherein:
said back plates comprise spring steel.

20. The agricultural implement of claim 13, which includes:
said mounting plate having a keyhole slot adapted to receive the head of said mounting bracket mounting bolt.

21. The agricultural implement of claim 13, which includes an air spring down-pressure system for applying a down pressure to said disc and soil strip assemblies.

22. The agricultural implement of claim 13 wherein each said row unit includes a parallel-arm linkage subassembly comprising right and left pairs of upper and lower linkage arms each connected to said tool bar and to a respective row unit arm.

23. A soil strip assembly for a seed drill row unit including a rearwardly extending arm, said arm having a bottom plate and sidewalls extending below said bottom plate and defining a channel, a disc assembly having a pair of discs rotatably mounted on and depending from said arm for working soil, said discs creating a trench in the soil as said row unit moves forward, said soil strip assembly closing the soil trench and comprising:
(a) a mounting bracket with a bracket base and first and second bracket arms, each of said bracket arms having a front end attached to said bracket base and a trailing back end;
(b) each of said mounting bracket arms extending rearwardly from said base along a respective side of said disc assembly;
(c) a mounting plate attached to said row unit arm in front of said opener disc assembly;
(d) said row unit arm having a pair of side plates forming a downwardly-open channel;
(e) said mounting plate and said bracket base being received in said channel;
(f) said row unit arm side plates engaging said bracket base in an anti-rotational engagement therewith whereby said soil strip assembly is secured against rotation relative to said disc assembly;
(g) a mounting bracket fastener comprising a bolt and a nut;
(h) said mounting plate depending downwardly from said row unit arm and having a mounting bolt receiver;
(i) said mounting bracket base having a mounting bolt receiver aligned with said receiver in said mounting plate;
(j) at least one of said mounting bolt receivers comprising an elongated slot adapted for vertically slidably receiving said mounting bolt whereby said soil strip assembly is vertically adjustable;
(k) first and second flexible soil strips each having a front end and a back end, said front end attached to the top of a respective mounting bracket arm back end;
(m) said soil strips extending downwardly and rearwardly from said mounting bracket arms along either side of said disc assembly;
(n) first and second back plates mounted on top of said first and second soil strips respectively;
(o) each back plate having a front end attached to a respective soil strip front end and a respective bracket arm back end;
(p) each said back plate having a back end terminating in front of a respective soil strip back end;
(q) each said bracket arm back end, soil strip front end and back plate front end having a pair of soil strip mounting bolt receivers;
(r) respective bracket arm, soil strip and back plate receivers being aligned; and
(s) first and second pairs of soil strip fasteners each comprising a carriage bolt with a head located below a respective bracket arm and a locknut located above a respective back plate.

24. An agricultural implement comprising:
a seed drill row unit including an arm and an opener disc assembly rotatably mounted on said row unit arm;
a soil strip assembly including a mounting bracket having a bracket base and first and second bracket arms, each of said bracket arms having a front end attached to said bracket base and a trailing back end;
said base being attached to said row unit arm in front of said opener disc assembly;
each of said mounting bracket arms extending rearwardly from said base along a respective side of said disc assembly;
each said bracket arm back end, soil strip front end and back plate front end having a pair of soil strip mounting bolt receivers;
respective bracket arm, soil strip and back plate receivers being aligned; and
first and second pairs of soil strip fasteners each comprising a carriage bolt with a head located below a respective bracket arm and a locknut located above a respective back plate.

25. An agricultural implement comprising:
a seed drill row unit including an arm and an opener disc assembly rotatably mounted on said row unit arm;
a soil strip assembly including a mounting bracket having a bracket base and first and second bracket arms, each of said bracket arms having a front end attached to said bracket base and a trailing back end;
said base being attached to said row unit arm in front of said opener disc assembly;
each of said mounting bracket arms extending rearwardly from said base along a respective side of said disc assembly;
first and second flexible soil strips each having a front end mounted in overlying relation on top of a respective mounting bracket arm trailing back end;
said first and second flexible soil strips each having a trailing back end;
said soil strips extending downwardly and rearwardly from said mounting bracket arms along either side of said disc assembly;
said bracket arms and said soil strips diverging rearwardly from said mounting bracket base; and
said soil strips extending rearwardly from a rear edge of said disc assembly.

* * * * *